US009459107B2

(12) United States Patent
Payne et al.

(10) Patent No.: US 9,459,107 B2
(45) Date of Patent: Oct. 4, 2016

(54) SYSTEM AND METHOD FOR PROVIDING ADAPTIVE VEHICLE SETTINGS BASED ON A KNOWN ROUTE

(71) Applicant: Toyota Motor Engineering & Manufacturing North America, Inc., Erlanger, KY (US)

(72) Inventors: Joshua D. Payne, Irvine, CA (US); Mohammad E. Dufford, Los Angeles, CA (US); Geoffrey D. Gaither, Meito-Ku Nagoya (JP)

(73) Assignee: Toyota Motor Engineering & Manufacturing North America, Inc., Erlanger, KY (US)

(*) Notice: Subject to any disclaimer, the term of this patent is extended or adjusted under 35 U.S.C. 154(b) by 0 days.

(21) Appl. No.: 14/685,409

(22) Filed: Apr. 13, 2015

(65) Prior Publication Data
US 2015/0274177 A1 Oct. 1, 2015

Related U.S. Application Data

(63) Continuation of application No. 14/231,457, filed on Mar. 31, 2014, now Pat. No. 9,008,858.

(51) Int. Cl.
*G01C 21/30* (2006.01)
*G01C 21/34* (2006.01)
*B60H 1/00* (2006.01)
*B60G 17/0195* (2006.01)
*B60G 17/02* (2006.01)
*B60G 17/08* (2006.01)
*B60W 50/00* (2006.01)

(52) U.S. Cl.
CPC ........... *G01C 21/34* (2013.01); *B60G 17/0195* (2013.01); *B60G 17/02* (2013.01); *B60G 17/08* (2013.01); *B60H 1/00771* (2013.01); *B60W 50/0097* (2013.01); *B60W 50/0098* (2013.01); *B60G 2400/204* (2013.01); *B60G 2401/16* (2013.01); *B60G 2500/10* (2013.01); *B60G 2500/20* (2013.01); *B60W 2050/0089* (2013.01); *B60W 2550/402* (2013.01); *Y02T 10/84* (2013.01)

(58) Field of Classification Search
None
See application file for complete search history.

(56) References Cited

U.S. PATENT DOCUMENTS

| 7,788,027 | B2* | 8/2010 | Jones | G01C 21/26 701/301 |
| 8,290,695 | B2* | 10/2012 | Hiestermann | G01C 21/32 15/42 |
| 8,718,925 | B2* | 5/2014 | Letchner | G01C 21/3484 701/410 |
| 8,755,993 | B2* | 6/2014 | Calkins | G01C 21/3469 340/995.19 |
| 8,892,350 | B2* | 11/2014 | Weir | G09B 29/00 701/400 |

(Continued)

*Primary Examiner* — Jonathan M Dager
(74) *Attorney, Agent, or Firm* — Snell & Wilmer LLP

(57) ABSTRACT

Systems and methods for adaptively adjusting settings of a vehicle during a known route are described. A method may include storing a driving route, parsing the driving route into a plurality of segments based on at least one of a turn detection, an intersection detection, a change in road conditions, a change in speed of the vehicle, or a predetermined distance traveled. The method may also include assigning to each segment a unique identification code, storing a plurality of values correlating to settings, the settings having values determined during a segment of the driving route, and associating each of the plurality of values to the unique identification code of the segment in which the setting was determined. The method may also include automatically changing each of the plurality of values at the beginning of each segment in which the value was altered.

22 Claims, 6 Drawing Sheets

(56) References Cited

U.S. PATENT DOCUMENTS

| | | | | |
|---|---|---|---|---|
| 9,090,279 B2* | 7/2015 | Buerkle | ............ | B60W 50/0098 |
| 2003/0093217 A1* | 5/2003 | Petzold | ............. | G01C 21/3484 |
| | | | | 701/411 |
| 2007/0138347 A1* | 6/2007 | Ehlers | ................ | G01C 21/3461 |
| | | | | 246/1 R |
| 2007/0271034 A1* | 11/2007 | Perry | ................. | G01C 21/3492 |
| | | | | 701/533 |
| 2008/0027639 A1* | 1/2008 | Tryon | ..................... | B60K 6/46 |
| | | | | 701/533 |
| 2008/0215237 A1* | 9/2008 | Perry | ................. | G01C 21/3484 |
| | | | | 701/533 |
| 2008/0221787 A1* | 9/2008 | Vavrus | ............... | G01C 21/3469 |
| | | | | 701/423 |
| 2009/0048775 A1* | 2/2009 | Okude | ............. | G01C 21/3484 |
| | | | | 701/533 |
| 2009/0082967 A1* | 3/2009 | Hara | ................. | B60H 1/00735 |
| | | | | 701/530 |
| 2009/0088962 A1* | 4/2009 | Jones | ................. | G06F 17/3087 |
| | | | | 701/519 |
| 2009/0150024 A1* | 6/2009 | Kojima | ............. | B60H 1/00642 |
| | | | | 701/36 |
| 2010/0010697 A1* | 1/2010 | Soma | .................... | B60K 6/445 |
| | | | | 701/22 |
| 2010/0106603 A1* | 4/2010 | Dey | .................. | G01C 21/3484 |
| | | | | 705/14.63 |
| 2010/0228574 A1* | 9/2010 | Mundinger | .......... | G06Q 10/047 |
| | | | | 705/4 |
| 2011/0224893 A1* | 9/2011 | Scofield | ............. | G01C 21/3492 |
| | | | | 701/119 |
| 2013/0151047 A1* | 6/2013 | Choi | .................. | B60L 15/2045 |
| | | | | 701/22 |
| 2014/0012446 A1* | 1/2014 | Kumar | ................ | B60L 11/1801 |
| | | | | 701/22 |
| 2014/0032087 A1* | 1/2014 | Shiri | ...................... | G06F 17/00 |
| | | | | 701/117 |
| 2014/0046595 A1* | 2/2014 | Segawa | .................. | G01C 21/34 |
| | | | | 701/541 |
| 2014/0095072 A1* | 4/2014 | Raab | .................... | G01C 21/26 |
| | | | | 701/537 |
| 2014/0107876 A1* | 4/2014 | Kapp | ..................... | B61L 3/006 |
| | | | | 701/20 |
| 2014/0207333 A1* | 7/2014 | Vandivier | ............ | B60N 2/0244 |
| | | | | 701/36 |
| 2015/0274030 A1* | 10/2015 | Payne | ................ | B60L 11/1874 |
| | | | | 701/22 |

* cited by examiner

MEMORY 108

Col 400 Col 402 Col 404 Col 406

| ROUTE | SEGMENT | SETTING | VALUE |
|---|---|---|---|
| A1 | A1S1 | ECO / SPORTS | ECO / NORMAL / SPORT / SUPER SPORT |
| | | CLIMATE | LOWER BODY, UPPER BODY, DEFROST; A/C / HEAT/VENT, RECYCLE; REAR DEFROST, MIRROR DEFROST |
| | | LIGHTS | DAY RUN / HEADLIGHTS / HIGH BEAMS, FOG; PARK, EMERGENCY, FRONT AND REAR SIDE MARKERS LICENSE PLATE, TAIL; INTERIOR |
| | | WIPERS | OFF / SLOW / MEDIUM / FAST |
| | | SEAT POSITION | FORWARD / BACK, UP / DOWN, LEAN FORWARD / LEAN BACK |
| | | MIRRORS | REVERSE VIEW / FORWARD VIEW / DIFFERENT ANGLES, ANTI-GLARE ON / OFF |
| | | WINDOWS | UP / DOWN, LOCK / UNLOCK |
| | | SUNSHADES | FORWARD / REAR, LEFT / RIGHT, UP / DOWN / PARTIALLY DOWN |
| | | SUN ROOF | OPEN / CLOSE / VENT |
| | | LOCKS | LOCK / UNLOCK / SOME LOCKED |
| | | SEAT TEMPERATURE | HEAT (LOW, MEDIUM, HIGH) / COOL (LOW, MEDIUM, HIGH) |
| | | NAVIGATION | OFF / STANDBY / NAVIGATE TO A DESTINATION |
| | | TRACTION CONTROL | ON / OFF |
| | | PARKING BRAKE | ON / OFF |
| | | FUEL TANK DOOR | OPEN / CLOSE |
| | | MPH / KPH DISPLAY | MPH / KPH |
| | | CRUISE CONTROL | ON / OFF / DETERMINED SPEED |
| | | VEHICLE TO VEHICLE DISTANCE | ON / OFF |
| | | BATTERY CHARGE TIME | NONE / SLOW / FAST |
| | | DISPLAY | CLIMATE / AUDIO / NAVIGATION / OFF / PHONE |
| | | PHONE | OFF / STANDBY / CALL A NUMBER / HANG UP |
| | | POWER | OFF / ON / STANDBY |
| | | TRUNK | OPEN / CLOSE |
| | | AUDIO | VOLUME, BASS / TREBLE / MID; SPEAKER SELECT AND POWER; INPUT AND STATION / ALBUM / PLAYLIST / SONG SELECT (RADIO, AUX INPUT, BLUE TOOTH, USB, OTHER |
| | ⋮ | SUSPENSION FIRMNESS | LOW / MEDIUM / HIGH |
| | A1SN | | |
| A2 | A1S1 | • | • |
| | A2S1 | | |
| | A2S2 | • | • |
| | A1S4 | | |
| B1 | A1S1 | | |
| • | A1S2 | • | • |
| • | B1S1 | | |
| • | B1S2 | | |
| | ⋮ | | |

FIG. 4

SYSTEM AND METHOD FOR PROVIDING ADAPTIVE VEHICLE SETTINGS BASED ON A KNOWN ROUTE

CROSS-REFERENCE TO RELATED APPLICATIONS

The present Application for Patent is a continuation application of U.S. application Ser. No. 14/231,457, entitled "System and Method for Providing Adaptive Vehicle Settings Based on a Known Route," filed on Mar. 31, 2014, now U.S. Pat. No. 9,008,858, and assigned to the assignee hereof and hereby expressly incorporated by reference herein.

BACKGROUND

1. Field

The present invention describes methods, devices, and/or systems for adjusting automobile settings based on a history of driving on a known route. For example, the methods and systems may recognize that a vehicle is on a known route, divide up or parse the known route into separate segments, store vehicle setting preferences for each segment of the known route, and apply the stored vehicle setting preferences for each segment of the known route.

2. Description of the Related Art

As new technology advancements are being developed for vehicles, drivers and users of vehicles are now able to control more features, functions and vehicle settings than ever before. Given the large number of vehicle settings now available, the driver or the passenger may need extra time, energy and effort to make these selections and deselections. That is, one may need to navigate through several screens and/or push several buttons to make a desired selection or deselection. Therefore, when a driver or a user wants to change a vehicle setting, the driver or the user has to manually make the change every time, resulting in potentially an inefficient use of the driver's or user's time.

The driving or vehicle experience can be improved by improving the efficiency and ease of selecting and deselecting the vehicle settings. Hence, the present invention provides for advancements and improvements to selecting and deselecting various vehicle settings.

SUMMARY

This Summary is included to introduce, in an abbreviated form, various topics to be elaborated upon below in the Detailed Description.

Systems and methods for adaptively adjusting settings of a vehicle during a known route are described. In one embodiment, a method may include storing, in a memory, a start location and an end location of a driving route, parsing, using a processor, the driving route into a plurality of segments based on at least one of a turn detection, an intersection detection, a change in road conditions, a change in speed of the vehicle, or a predetermined distance traveled. The method may also include assigning to each segment a unique identification code, storing, in the memory, a plurality of values correlating to settings, the settings having values determined during a segment of the driving route, and associating, in the memory, each of the plurality of values to the unique identification code of the segment in which the setting was determined. The method may also include automatically changing, using the processor, each of the plurality of values at the beginning of each segment in which the value was altered.

BRIEF DESCRIPTION OF THE DRAWINGS

The features, obstacles, and advantages of the present invention will become more apparent from the detailed description set forth below when taken in conjunction with the drawings, wherein:

FIG. 4 illustrates sample information stored in a memory module according to one or more embodiments described herein.

DETAILED DESCRIPTION

Apparatus, systems, and/or methods that implement the embodiments of the various features of the present invention will now be described with reference to the figures. The figures and the associated descriptions are provided to illustrate some embodiments of the present invention and not to limit the scope of the present invention. Throughout the drawings, reference numbers are re-used to indicate correspondence between referenced elements. A connection, when mentioned in this document, may refer to any communication channel between modules, and the communications may occur via a wired connection, a wireless connection, or a combination of the two.

Figure 1:
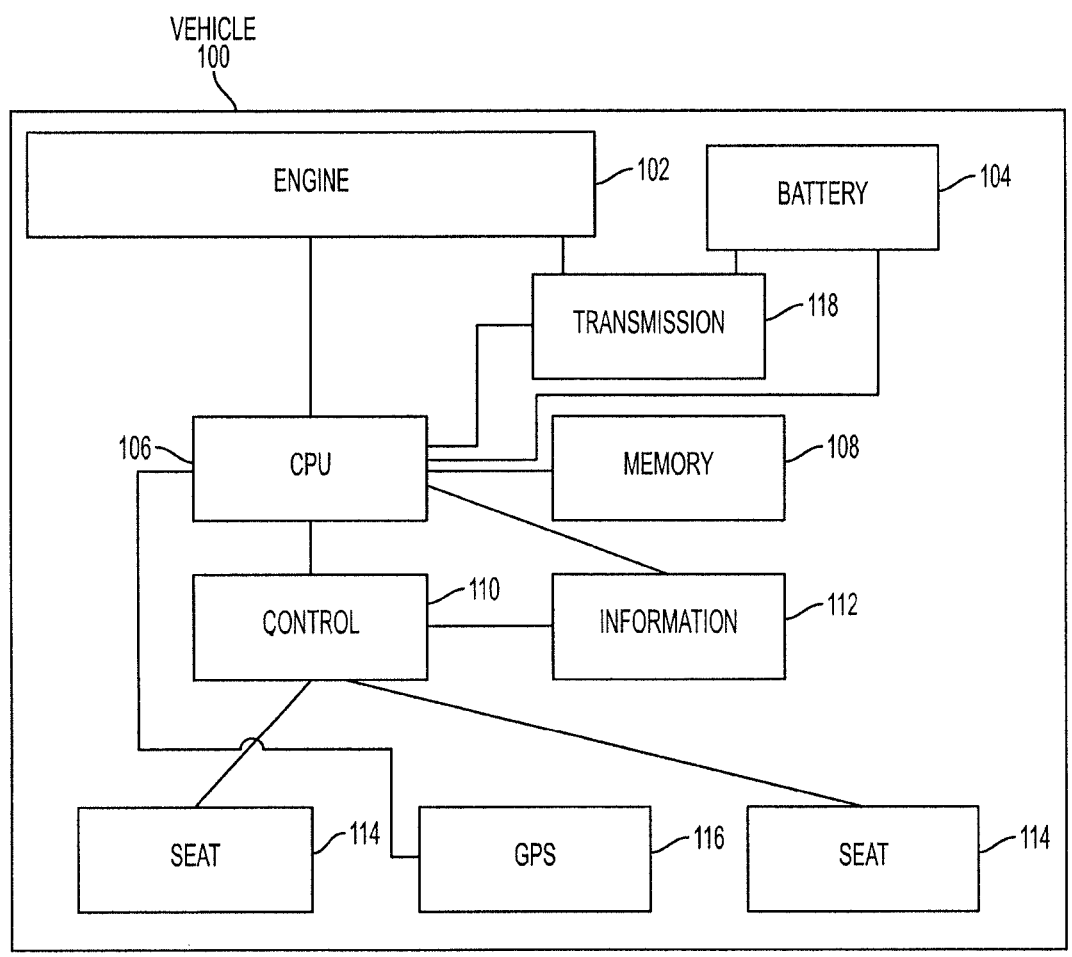
FIG. 1 illustrates a vehicle with an adaptive vehicle setting based on a known route according to one or more embodiments described herein.

Turning to FIG. 1, some components of a vehicle 100 are illustrated. The components of the vehicle 100 are not limited to the components shown and described in FIG. 1. The vehicle 100 includes an engine 102, a battery module 104 including at least one battery, a central processing unit (CPU) module 106 including at least one processor or controller, a memory module 108 including at least one memory device, a control module 110, an information module 112, seats 114, a GPS module 116, and a transmission 118. Most of these devices, including the memory module 108, may be disposed in the vehicle 100 or may be displaced in a location remote from the vehicle 100. The CPU module 106 may be a processor, a controller, an application or other device capable of executing instructions or software. The lines or connections shown in FIG. 1 can be wired, wireless or a combination thereof. Also, the lines or connections can be one way (one arrow) or two way (two arrows) showing the transfer of information and data in one or both directions.

In one embodiment, the vehicle 100 may be powered by either or both of the engine 102 and the battery module 104. The battery module 104 may include a motor for generating torque. The CPU module 106 may communicate with both of the power sources, the engine 102 and the battery module 104, and other components of the vehicle 100. The CPU module 106 may also control, within the vehicle 100, clutching and gearing mechanisms associated with the transmission 118. The CPU module 106 may be connected to the memory module 108, where vehicle information may be stored. The CPU module 106 may also be connected to the control module 110 in order to apply setting values to components of the vehicle 100, and may be connected to the information module 112 in order to display information to components of the vehicle 100 or to a user. Additionally, the CPU module 106 may be connected to the GPS module 116 in order to send and receive information.

The engine 102 and the battery module 104 may be connected to the transmission 118 with a controllable transmission input/output ratio for driving the wheels using torque provided by the engine 102 and/or the battery module 104. The engine 102 and/or the battery module 104 may be connected to the transmission 118, for example, via a differential linkage, power splitting mechanisms, and/or various other linkages known in the art.

The control module 110 may include a variety of controls for controlling various settings of the vehicle 100. The control module 110 may include, but is not limited to, controls for an operational mode of the vehicle 100 (e.g., eco mode, sports mode, comfort mode, etc.), a vehicle climate, interior and exterior lights, wipers, seat positions, mirrors, windows, sunshades, sunroofs, locks, seat temperatures, a navigation system, a traction control system, a parking brake, a fuel tank door, a miles per hour (MPH)/kilometers per hour (KPH) display, cruise control modes, a vehicle to vehicle distance, a battery charge amount and time, a display, a cellular phone, the vehicle's power, a trunk, an audio system, power steering settings, a suspension system (e.g., firmness), and so on. The values of the settings within the control module 110 may be altered by the user and/or the CPU module 106.

The vehicle 100 may also include the information module 112. The information module 112 may have a display screen for displaying any of the values of the settings of the controls module 110, including, but not limited to, navigation maps and directions, an audio source, music information, remaining power and/or charge time remaining within the battery module 104, and any other information including settings values for the control module 110. The information module 112 may display information in any other digital or analog fashion, and may relay information, possibly through the CPU module 106, to any component of the vehicle 100.

The vehicle 100 may also include seats 114 for a driver and at least one passenger.

Figure 2A:
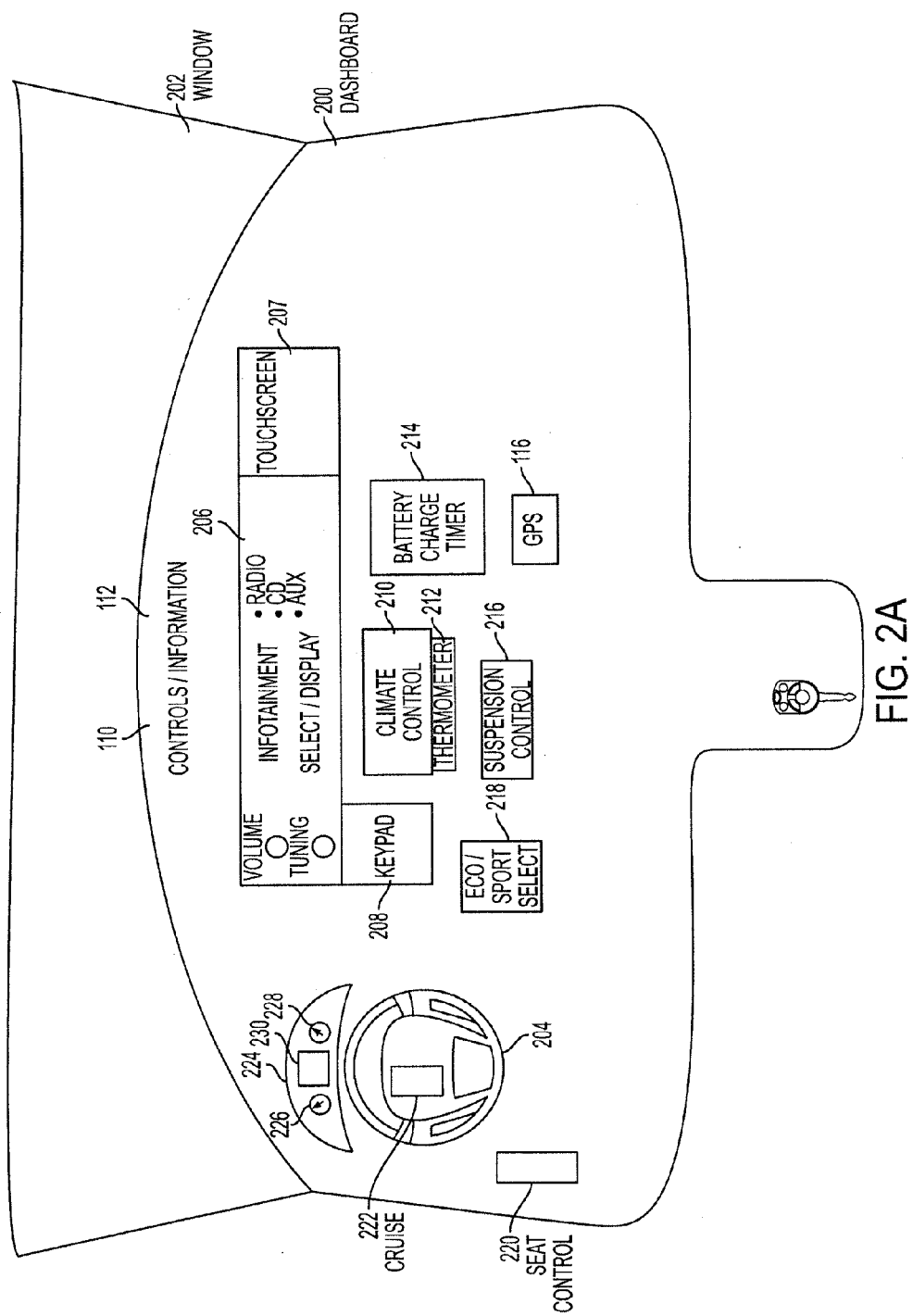
FIG. 2A illustrates a driver's view of the vehicle's controls according to one or more embodiments described herein.

FIG. 2A illustrates the driver's view of the vehicle's controls. In this embodiment, the driver's view may include a dashboard 200, a front window 202 and a steering wheel 204. The dashboard 200 may include components of the control module 110 and the information module 112.

Some controls within the control module 110 may be distributed over the entire dashboard 200. The controls within the control module 110 may be received from an infotainment select/display module 206, which may include controls for an audio system, such as volume, tuning, and an input select for inputs from a radio, a compact disc (CD) or an auxiliary input. The controls within the control module 110 may also include a touchscreen 207, a keypad 208, a climate control module 210, a thermometer 212, a battery charge timer 214, a drive mode selector 218, a seat control module 220, a GPS module 116 and/or a cruise control module 222. The cruise control module 222 may be located on the steering wheel 204 or elsewhere. The location of the cruise control module 222 shows that the controls within the control module 110 are not limited to any specific location, and may be located anywhere within the vehicle 100 or even in a location remote from the vehicle 100, including a remote location where controls may be sent by a signal, such as over a wireless connection. Additionally, in different embodiments, any controls within the control module 110 may be adjusted by digital inputs, such as digital buttons and a touchscreen, or analog inputs, such as potentiometers and analog buttons, or any combination of the two.

In some embodiments, the settings within the control module 110 may be displayed on a display within or coupled to the information module 112. Some information displayed within the information module 112 may be distributed over the entire dashboard, as well as in other locations inside and remote from the vehicle 100. The display information may be sent by signal over a wired or wireless connection. In the embodiment shown in FIG. 2A, the settings and other information may be displayed on the infotainment select/display module 206, the touchscreen 207, the climate control module 210, the thermometer 212, the battery charge timer 214, the drive mode selector 218, the seat control module 220, the GPS module 116 and/or the cruise control module 222. The information module 112 may also display information over displays on an instrument cluster 224, such as a speedometer 226, a tachometer 228 or a digital display 230. In some embodiments, the displays within the information module 112 may be analog displays, such as the tachometer 228, or digital displays, such as the touchscreen 207.

Figure 2B:
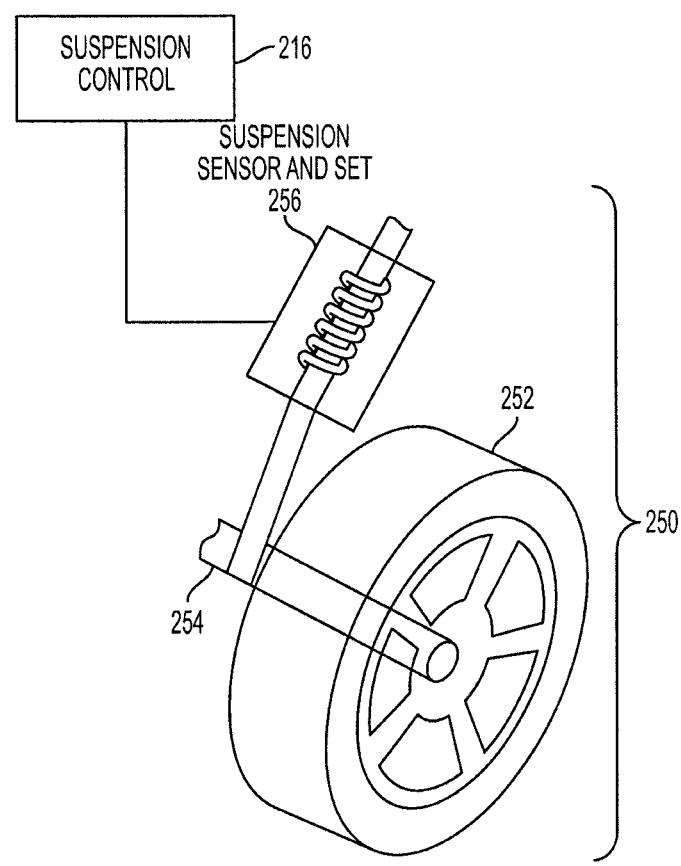
FIG. 2B illustrates a partial suspension and wheel system according to one or more embodiments described herein.

FIG. 2B illustrates a simplified embodiment of a partial suspension and wheel system 250. The system 250 includes a wheel 252, an axle 254 and a suspension sensor and set module 256. The wheel 252 may be connected to the axle 254, which in turn may be connected to the suspension sensor and set module 256. The control module 110 may communicate with the suspension sensor and set module 256 such that the tension or damping of the suspension may be set or adjusted using the control module 110. Furthermore, the information module 112 may communicate with the suspension sensor and set module 256 so that the tension or damping of the suspension may be displayed on the display screen of the information module 112.

In one embodiment, the CPU module 106 and the memory module 108 receive information from the GPS module 116, the information module 112 and/or the control module 110. Different routes of the vehicle 100 may be stored in the memory module 108. The CPU module 106 may receive information from the control module 110, the information module 112 and the GPS module 116, as well as receive the time of day from a clock (not shown).

From the GPS module 116, the vehicle 100 may record in the memory module 108, a driving route of the driver and process the driving route along with the time of day. This will be explained in more detail with regards to FIGS. 3A-3C. If the driving route has not been previously recorded, then after driving the driving route and recording values from different settings within the vehicle 100, the driving route may become classified as a known route. During the process of recording the driving route, the vehicle 100 may divide the route into many segments, where each segment represents a portion of the driving route, and may store the segments, along with corresponding values for settings, in the memory module 108.

A driving route may be parsed into one or more segments based on one or more different identifiers. These identifiers include, but are not limited to, a change in the speed of a vehicle, a cross street, a vehicle stop (e.g., representing anything from stopping to pick up a passenger, a stop at a defined location such as a traffic light, a stop sign, a store, a bank, a restaurant, a place of work, etc.), a turn (e.g., a curve in the road, a turn of about 90 degrees, or a U-turn, etc.), road conditions (e.g., a smooth/rough road transition, a road with many potholes, a road with road construction materials, etc.), a predetermined distance, a predetermined travel time, an incline or decline of a road such as a hill, or any change of a setting, either driver or vehicle 100 induced. However, these identifiers may not necessarily always result in a new segment being defined.

A route, as used herein, may refer to a distance travelled between an event signaling a beginning of a trip and an event signaling an end of a trip. For example, such an event may be that the ignition is turned on and subsequently turned off. For example, such an event may be that a door of the vehicle 100 is opened and then shut, and then the door is subsequently opened and shut. The time and/or location of each event may be recorded. "Time," as used herein, may refer to a time of the day, a day of the week, a date, or any other temporal parameter that may be stored regarding a route segment, route, and/or a route set. A "location," as used herein, may refer to latitude or longitude coordinates, a GPS location, a location determined in reference to other known locations, or any other location data regarding the vehicle 100, route segment, route, and/or route set.

A route set may refer to a number of different routes linked with one another. The distance values of each route within a route set may be summed in order to obtain a distance of the route set that includes linked routes.

An example will be provided to describe a route set. A driver may leave his house at a specified time in the morning every weekday to go to work. Let's assume that the driver stops at a coffee shop on his way to work every Monday and Wednesday. Let's further assume that on Mondays and Wednesdays, the driver stops at a gym on his way home. The CPU module 106 may, over time, recognize that route 1 is from his house to the coffee shop, route 2 is from the coffee shop to his work, route 3 is from his work to the gym, and route 4 is from the gym to his house. Furthermore, using the linking algorithm, the CPU module 106 may recognize two route sets, the combination of routes 1 and 2, and the combination of routes 3 and 4. For the sake of simplicity, when a route is mentioned in the present document, it may be referring to a route or a route set.

One embodiment of a system or a method of route prediction will now be described. The memory module 108 may include a static data storage or database which may include a segment list and a route list. Each segment in the segment list may include a segment identifier, a segment distance, one or more "to" segments, one or more "from" segments, and a plurality of locations. The segment distance may represent the total distance of the segment. The one or more "from" segments may include segment identifiers for segments which have been historically traveled immediately before the segment, and the one or more "to" segments may include identifiers for segments which have historically been traveled immediately after the segment. Each location may include location data, including, but not limited to, latitude, longitude, altitude, speed, course, heading, direction, etc.

The route list may include a plurality of routes which may include a route identifier and an ordered list of segments.

A dynamic data storage or database may also be included within the memory module 108. The dynamic data storage or database may include a route history, which may include a plurality of route history entries. Each route history entry may include a route identifier and a route occurrence entry for each time the route was travelled. Each route history entry may also include a start date, a start time, a day of the week, and an ordered list of segments. Each segment in the ordered list may include an ordered list of segment identifiers which correspond to a segment stored within the static data storage or database. Each segment may also include a start time, an end time, a maximum speed, a minimum speed, an average speed, etc.

An exemplary method for parsing segments will now be described. The GPS module 116 may receive a first signal indicative of a first location which may include latitude, longitude, altitude, heading, direction, and/or speed, or any combination, along with any other data. If the signal does not include a heading or a speed, the GPS module 116 may calculate a heading and/or speed based on previous locations. The vehicle 100 may include sensors such as a gyroscope, an accelerometer, or any other sensor, configured to detect the heading and speed of the vehicle 100.

The vehicle 100 may store locations in the memory module 108 at regular or periodic intervals. The vehicle 100 may also store, in the memory module 108, locations parsed by a predetermined distance. These locations may all include a timestamp, may be successively numbered, or may be placed in order by any other method available.

In an embodiment, at least two locations will include a heading used for detecting when a turn has occurred. The CPU module 106 may calculate a difference between the current heading and a previous heading to determine if more than a heading threshold amount has been altered. For example, the heading threshold may be 50 degrees. If the vehicle 100 (i.e., the CPU module 106) determines, by calculating the difference between the previous heading and the current heading, that the difference is 60 degrees, which is above the heading threshold, then the vehicle 100 may determine that a turn has occurred. The heading threshold is not limited to 50 degrees, and in fact may be any degree of change in heading. For example, the current heading may be calculated based on the change in latitude and longitude between the current and any previous location.

This method may be used as well to calculate a previous heading. To do so, the vehicle 100 may need to calculate a heading difference between two or more previous locations. The previous locations used to calculate the previous heading may be calculated based on the current speed of the vehicle 100. For example, if the speed is less than 30 mph, then the previous heading may be calculated for the third preceding location (for example, based on the difference in latitude and longitude between the third and fourth preceding locations). However, if the speed is between 30 mph and 60 mph, then the previous heading may be calculated for the sixth preceding location. One of ordinary skill in the art will realize that the speed is not necessary in the equation to determine a previous location, and the correlation between the speed and the number of previous locations may be different than mentioned above.

With the current and previous heading information, the CPU module 106 may calculate a difference between the current and previous headings. For example, this may be calculated by subtracting one of the current or previous headings from the other of the current or previous heading.

The CPU module 106 may compare the difference in the current and a previous heading to determine if a turn has occurred. A turn has occurred if the difference in headings exceeds the heading threshold.

The CPU module 106 may be configured to store in the memory module 108, a segment when a turn has occurred. The segments typically represent a geographic area between detected turns, and may be stored in a segment list. The stored segment may include a starting location and an ending location. The stored segment may also include one or more previous locations. The segment may be stored in the static data storage or database in the segment list and/or may be added to the ordered list of segments within the dynamic data storage or database. This is an example of one embodiment for parsing and storing segments, and there are other embodiments which use vehicle speed, road conditions, vehicle stops, etc., as mentioned above, with which to parse routes into segments.

In this embodiment of route prediction, the vehicle 100 may predict a route based on the segment list as discussed below. In this embodiment, the GPS module 116 may receive a second signal representing another location, which may include a latitude, longitude, altitude, heading and/or speed. Based on the second signal and a previous signal, the vehicle 100 may identify segment candidates from the segment list. One method of identification is to determine the distance between the second location and each location of each segment in the segment list, and identify the one or more segment candidates as those which have at least one location within a threshold distance from the second location. Thus, any segment within the threshold distance may be identified as a segment candidate.

In some embodiments, a list of route candidates may be determined by the CPU module 106 and stored in the memory module 108. These candidates may be identified by determining which routes of the route list include any of the segment candidates and identifying routes including the segment candidates as route candidates.

In some embodiments, the CPU module 106 may calculate or assign a route weight for each candidate route. In one example, the route weight for each identified candidate route may be calculated based on information associated with that route in the memory module 108. This route weight may be calculated based on the start date, the start time, the day of the week, the time of the day, the ratio of number of times the candidate route was travelled to the total number of times all candidate routes were travelled, etc. The route weight may include multiple components, such as when the route includes a day of the week component, a type of day component, and a time of day component. The day of the week components may be calculated by dividing the total number of times that the candidate route is included in the database on the current day of the week by the total number of times that candidate is included in the database. Along the same manner, the type of day component may be calculated by dividing the total number of times the candidate was included on the current type of day by the total number of times the candidate is in the database. Similarly, a time of day weight may be calculated by dividing the total number of times the candidate is included at the particular time of day by the total number of times the candidate is in the database. These are only examples and are not intended to limit the route calculation methods.

Once the CPU module 106 has calculated the route weights for all candidate routes, the CPU module 106 may select a route by selecting the candidate route with the highest route weight. The list of candidate routes and/or candidate segments may be updated continuously or periodically based on the current location of the GPS module 116.

In some embodiments, after a predicted route is selected, the GPS module 116 (or any other components or equipment in the information module 112) may display the route graphically. The display equipment may receive inputs, using the control module 110, from a user which indicates confirmation of whether the predicted route is correct. However, some embodiments may not request a confirmation of the predicted routes. In some embodiments, if the user indicates that the predicted route is not correct, then the CPU module 106 may display one or more predicted routes and request a confirmation.

During each recorded segment, the CPU module 106 may store, in the memory module 108, a route identifier, a segment identifier, and a value for each setting within the vehicle 100. This information may be set within the control module 110 by the CPU module 106 and/or by the user. The current settings and possible values may be displayed in the information module 112. Possible settings and values will be discussed later with reference to FIG. 4. This information (i.e., route segments and settings values) which may be stored within the memory module 108 is referred to as a driver preference for a route.

If a route is known, then there may already be a driver preference for the route. The CPU module 106 may predict a route based on one or more of the following: the time of day, the starting location, the previous segment, the direction in which the vehicle 100 is traveling, turn detection, or any combination of these. Furthermore, a route may be predicted before and/or after the vehicle 100 begins movement, for example, if a destination is entered into the GPS module 116. In this example, once the vehicle 100 determines that a route may be known and has stored a driver preference for the route, the CPU module 106 may apply the stored values of the settings to each segment of the known route.

In one embodiment, the CPU module 106 may predict a route with which to apply a driver preference before a known route is initiated in order to create a particular driving and cabin environment. For example, the CPU module 106 may learn that a driver takes a known route at 7:15 a.m. every morning and has learned the driver preference for this route (e.g., the driver preference including setting the temperature to 72 degrees Fahrenheit and playing a sports talk radio channel 710). In such a situation, the CPU module 106 may precondition the cabin prior to the driver entering the vehicle 100. In this example, the vehicle 100 may activate an HVAC system of the vehicle 100 in order to have the cabin temperature be 72 degrees and have the sports talk radio station on (or preset so that no adjustments are needed when these systems are turned on when the vehicle 100 is started) both before 7:15 a.m. in the morning when the driver enters the vehicle 100.

In one embodiment, the CPU module 106 may determine that along a certain route, when the vehicle 100 stops, the driver prefers to take certain actions, such as unlocking the cars, rolling up the windows, positioning the seat 114 farther back in the vehicle 100, etc. On a known route, the CPU module 106 may learn this behavior and apply the actions when the vehicle 100 stops on the route.

In one embodiment, the CPU module 106 may change the settings of the battery charge timer 214 for a period of time in which the vehicle 100 is parked and connected to a battery charger. For example, the CPU module 106 may learn that at 8:00 a.m. in the morning every weekday, the vehicle 100 will remain parked for at least 8 hours. In this example, the CPU module 106 may adjust the battery charge timer 214 so that the battery module 104 may receive a slow or slower charge over the 8 hours. The battery charge timer 214 values may also be changed during a period where the vehicle 100 (i.e., the battery module 104) is charging. For example, if the CPU module 106 knows it will be charging from 4:00 p.m. until 10:00 p.m., the CPU module 106 may decide to wait until later in the time period to initiate charging. These situations can result in a better value for the purchase of electricity for the purpose of charging the vehicle 100, as the price of electricity may change constantly throughout a time period.

In one embodiment, the CPU module 106 may adjust some settings without user input for a given known route or segment. For example, the CPU module 106 may learn that the road is rough over a particular segment of a known route. The vehicle 100 may use sensors, such as one in the suspension sensor and set module 256, to detect levels of shock on the vehicle's 100 suspension, or may detect amounts of tire vibration in order to determine that the road is rough over this segment. In this example, when the vehicle 100 reaches this known segment along the route, the CPU module 106 may automatically enable softer suspension settings (possibly by changing settings within the suspension sensor and set module 256) for the segment of the route over the rough terrain. The CPU module 106 may also enable tighter or stiffer suspension over very flat and soft roads to provide a better driving and cabin experience.

In an embodiment, the vehicle 100 may include external sensors, such as an exterior thermometer, a moisture detector, a sunlight detector, etc. The CPU module 106 may utilize input from these sensors in order to automatically change setting values. For example, if the driver prefers the cabin to be 72 degrees in the morning, the CPU module 106 may utilize the internal thermometer 212, the external thermometer, the sunlight detector, etc. in order to ensure the cabin will be a comfortable temperature for the driver. In another embodiment, the driver may prefer a cabin with certain humidity. By utilizing the moisture detector, etc., the CPU module 106 may determine to engage the air conditioning when the outside moisture is high, in order to ensure the cabin is less humid.

In other embodiments, the vehicle may receive this information from an external source, such as a broadcast of current weather conditions, etc. In this embodiment, a broadcast over a signal may be generated which provides, for example, weather information to any vehicle which can receive the type of broadcast. The vehicle 100 may then utilize this broadcasted information in order to achieve the values for settings which the driver prefers.

Figures 3A, 3B, 3C:
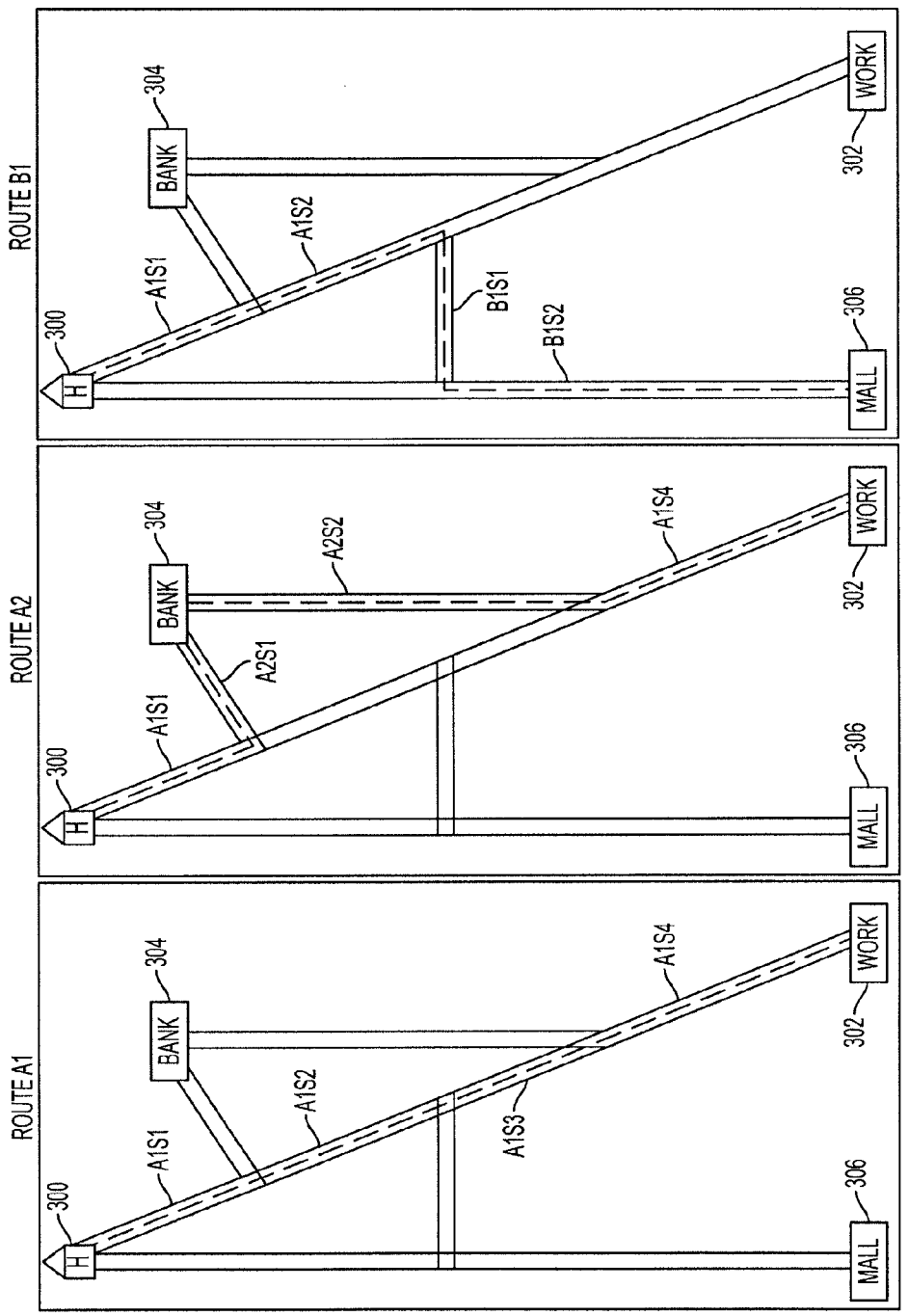
FIG. 3A illustrates a route and how it may be divided into segments according to one or more embodiments described herein.
FIG. 3B illustrates a route and how it may be divided into segments according to one or more embodiments described herein.
FIG. 3C illustrates a route and how it may be divided into segments according to one or more embodiments described herein.

FIGS. 3A, 3B and 3C illustrate examples of different routes, how routes may be determined, and how they may be divided into segments. FIG. 3A shows a route A1 which is a direct route from an individual's house 300 to that individual's work 302. As shown, the route begins at the individual's house 300 and ends at the individual's work 302, so a path with these starting and ending points may be defined as a route. For example, FIG. 3B shows another route, route A2, which is actually a route set. On route A2, the individual takes a detour on his way to work and stops at a bank 304 before proceeding to work 302. For example, the route from the individual's house to the bank may be referred to as route A21 and the route from the bank to the individual's work may be referred to as route A22, thus routes A21 and A22 combine to form a route set A2 or a route A2.

FIG. 3C shows another route B1. In route B1, the individual only drives from his house 300 to a mall 306. As the route has not previously been traveled, the CPU module 106 may now create another route B1.

In route A1, the CPU module 106 may create 4 segments, segments A1S1, A1S2, A1S3 and A1S4. As mentioned above, many factors may be used to determine segments within a route. FIG. 3A shows a simple example of dividing routes into segments, for example, each segment is separated at or by an intersection. For route 3A, the CPU module 106 may store a driver preference in the memory module 108. This driver preference may include values for any settings which the vehicle 100 or the user has set or which was preexisting before the route began. Before each segment, if the route (or segment) is known, the CPU module 106 may retrieve setting information from the memory module 108 and may use the CPU module 106 and the controls module 110 to apply values for the settings as stored in the memory module 108 for the correlating segment. This will allow the user preferences to be applied to all segments of the route.

The first time a new route is taken (for example route A1), the CPU module 106 may divide the route into segments. A non-inclusive list of triggers for new segments is described above. Furthermore, for every segment of the new route (for example, segments A1S1, A1S2, A1S3 and A1S4), values for all or some of the settings are stored in the memory module 108. In another embodiment, the memory module 108 may only store values for settings which were altered during a route.

In the example shown in FIG. 3B, the vehicle 100 has taken a detour to the bank 304 on its way to work 302. This detour has created two additional segments to be stored in the memory module 108: segments A2S1 and A2S2. The driver preference for route A2 may include the stored settings for segments A1S1 and A1S4. However, as the vehicle 100 is not traveling along segments A1S2 and A1S3, the vehicle 100 may have new values entered for the settings during segments A2S1 and A2S2. Thus, for route A2, the CPU module 106 may apply the known settings for segments A1S1 and A1S4, as well as the known settings for segments A2S1 and A2S2. In another embodiment, the driver preference for route A2 may include completely new settings for segments A1S1 and A1S4.

The first time a new route is taken which includes segments from other routes (for example, route A2), the CPU module 106 may divide the unknown part of the route into segments, or it may divide the entire route into segments without regard to the previously driven portion of the drive. For example, the CPU module 106 may divide the unknown portion of the route into segments, with segment A2S1 being initiated, for example, by the turn after A1S1, and terminated, for example, with the stop at bank 304. For example, the CPU module 106 may define segment A2S2 as being initiated with the departure from the bank 304 and terminated with the turn onto segment A1S4.

Additionally, in this example where route A2 is a new route, the CPU module 106 may store new values for some or all of the settings for each of the two new segments, A2S1 and A2S2. For example, these values may be stored in the memory module 108 so that they may be applied the next time route A2 is taken, when it will be a known route.

FIG. 3C depicts another route B1. Route B1 is a different route from route A1, as the destination is the mall 306 instead of the individual's work 302. If route B is known and a driver preference associated with it is stored in the memory module 108, values for settings, which may be stored in the memory module 108, may be applied for each segment.

Route B1 contains 4 segments: A1S1, A2S2, B1S1 and B1S2. In this example, the segments A1S1 and A1S2 have been stored with reference to route A1. Therefore, the CPU module 106 may reference the stored settings values for segments A1S1 and A1S2 from the saved driver profile for route A1, or it may have them stored in a driver profile for B1. However, segments B1S1 and B1S2 are only stored as parts of the driver profile for route B1.

At the phase where the CPU module 106 has to learn preferences, the CPU module 106 does not necessarily have to re-learn a driver profile for segments A1S1 and A1S2. Furthermore, a driver profile for these segments does not necessarily have to be stored again as segments of route B1, but it may be. This means that the memory module 108 may reference the portion of memory storing these settings and values from route A instead of using extra space to store the same information again.

In this embodiment, route B1 also contains segments B1S1 and B1S2. The CPU module 106 may store settings values for these segments.

In an embodiment, the vehicle 100 may not have traveled route B1 previously. The CPU module 106 may realize that the vehicle 100 is traveling along segments A1S1 and A1S2, and store the settings as a record under route B1 or it may simply reference the driver profile for these routes which is stored under route A1. However, the first time the vehicle 100 travels route B1, segments B1S1 and B1S2 may not have a driver profile in the memory module 108. In this situation, the CPU module 106 records all or some of the settings and values for segments B1S1 and B1S2 under a driver profile for route B1.

In an embodiment, the first two segments of route B1 may also have a different driver profile for segments A1S1 and A1S2 than in these segments in A1, in which case the settings and values may have to be stored again as a segment under route B1. An example of this embodiment is the case where the user prefers to listen to sports talk radio on his way to work (route A1) but prefers to listen to smooth jazz on his way to the mall (route B1). In this situation, the CPU module 106 may again reference the settings and values stored for the segments which are the same in both routes A1 and B1, and note that certain settings or values are different. Additionally, the CPU module 106 may create a new record for all of the segments of route B1 and not have them reference any segments from route A1.

FIG. 4 illustrates an example of information stored in the memory module 108. The information may be stored and referenced by a route (column 400), a segment within a route (column 402) and a particular setting (column 404). The memory module 108 may store a value for each setting (column 406). As mentioned above, a segment within a route may or may not reference another segment within another route. For example, segment A1S1 under route B1 may simply point to segment A1S1 under route A1, it may be an exact copy of segment A1S1 under route A1, it may be a copy of segment A1S1 with some values changed, it may be a copy of segment A1S1 with some settings absent, or it may point to segment A1S1 with notes that some values are different.

In column 404, there are various settings which may be stored as part of a driver profile. This invention is not limited to the settings listed in column 404 or anywhere else in this specification. For each of these settings, there are possible values associated with each one, listed in column 406. The memory module 108 will store anywhere from no values to one value to multiple values for each setting. For example, the eco/sports setting may contain a value for eco mode, normal mode, sport mode, or super sport mode. Additionally, the climate setting may contain values for a/c, heat, or vent; fans for lower body, upper body, defrost, or any combination; rear defrost; temperature settings; and mirror defrost, to name a few. The battery charge time may be anywhere in a range from no charge to slow charge to fast charge. The suspension firmness may also be set anywhere on a range from low firmness to high firmness. The audio setting may include settings for source (e.g., radio, AUX input, CD, Bluetooth, or USB), sound control (e.g., volume, bass, mid-range, treble), speaker select (e.g., front, back, left, right, any combination), and station/track/playlist/song select, for example. Additionally, the power steering settings may be set to normal, sport or any other setting (not shown). The settings and corresponding values of this invention are not limited to those settings and values listed in this paragraph, in FIG. 4, or anywhere else in this specification.

In some embodiments, some settings may be associated with to segments, some may be associated with to the initial conditions of the drive, some maybe associated with the end of routes, and some may be tied to any combination. For example, the eco/sports setting, the suspension firmness setting, etc. may be tied to different segments, as these settings may be changed periodically throughout the process of driving a route. Continuing the example, the climate setting, the audio setting, the battery charge timer setting, etc. may be tied to the initial conditions of the drive, as these settings may be likely to remain constant throughout the process of driving a route. Additionally, door lock settings may apply to both route end and initial condition situations. In this example, any of these settings may also be tied to segments, end of route situations, and/or the initial conditions of the drive.

Figure 5:
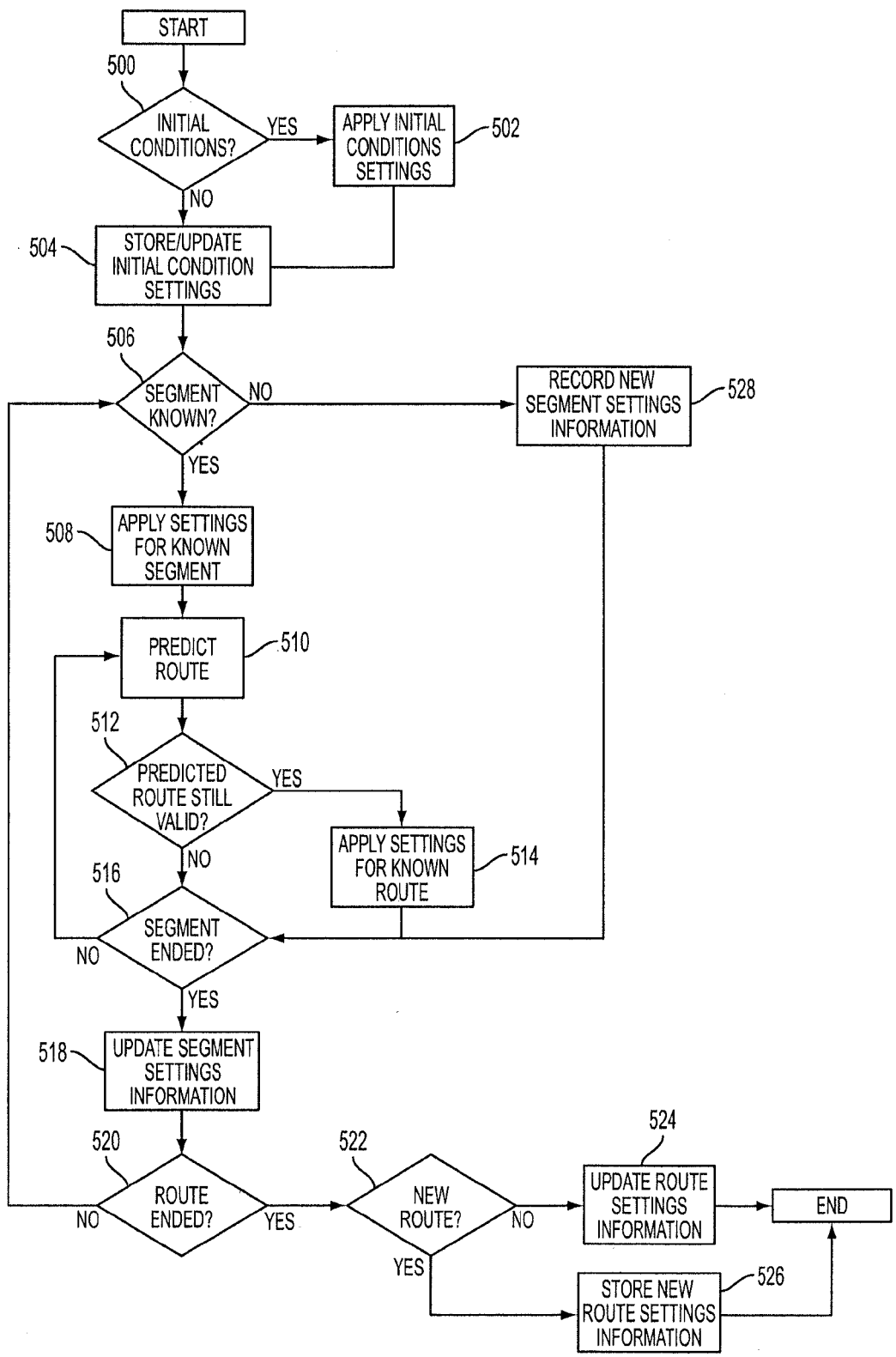
FIG. 5 illustrates a flow chart depicting a system or a method for depicting adaptive vehicle settings based on a known route according to one or more embodiments described herein.

FIG. 5 illustrates a flow chart depicting one embodiment of a system for depicting adaptive vehicle settings based on a known route. In block 500, the CPU module 106 may determine whether a drive associated with a driver preference includes initial condition settings. The CPU module 106 may determine this based on the current date and time, for example. If the CPU module 106 determines that an upcoming drive is associated with a driver preference including initial conditions, then in block 502, that driver preference may be applied to the vehicle 100. From block 502, the process may continue to block 504. The process may also continue to block 504 if the CPU module 106 determines that there are no initial conditions.

In block 504, the CPU module 106 may store the initial conditions for the route, if there was no initial settings information stored in the memory 108. The CPU module 106 may also update initial conditions of the route if initial condition information was stored in the memory 108, for example, if the initial condition setting values were set to different values than the stored initial conditions.

The process then may proceed to block 506, where the CPU module 106 may determine whether or not the initial segment is stored in the memory module 108. If the initial segment is stored in the memory module 108, then the process may continue to block 508. In block 508, the driver preference (e.g., settings and values) may be applied to the vehicle 100. In block 510, the CPU module 106 may predict a route, as described above in this document.

After the CPU module 106 predicts a route, the CPU module 106 determines, in block 512, if the route is still valid. The CPU module 106 may determine this in the manner described above. For example, the CPU module 106 may determine this based on if the next segment is stored in the memory module 108 as associated with the predicted route, or if the present heading, a change of direction, user input, etc. correlate to the predicted route information. If is determined that the route is still valid, then the process may continue to block 514, where the driver profile for the route may be applied to the vehicle 100, as instructed by the CPU module 106. After block 514, and if it is determined in block 512 that the predicted route is not still valid, then the process may proceed to block 516.

In block 516, the CPU module 106 may determine if the segment has ended. This may be determined by, for example, the known segment having been completed, an identifier which is chosen to parse routes into segments is encountered, etc. If the segment has not yet ended, then the process returns to block 510 where a route is predicted. If, however, the segment has ended, then in block 518, segment settings information (the driver preference) may be updated in the memory module 108 by the CPU module 106. This information may include, for example, any settings values which differ from the settings values associated in the memory module 108 and the segment.

In block 520, the CPU module 106 may determine if the route has ended. This may be determined, for example, if the vehicle stops for a period of time, if the vehicle 100 turns off or is turned off, if the CPU module 106 determines that all segments of a known route have been completed, etc. If the route has not ended, then the process may return to block 506, where it is again determined whether the next segment is known. If, in block 520, it is determined that the route has ended, then the process continues to block 522.

In block 522, the CPU module 106 determines whether the route was a new or known route. This may be determined by checking records in the memory module 108 to determine whether or not there is a record of the route. If the route is not new, then the process continues to block 524, where any change to the driver profile, to any segment of the route, is stored in the memory module 108. If, in block 522, the route is determined to be a new route, then in block 526, the CPU module 106 stores, in the memory module 108, new route settings and information. For example, this information may include route identifiers and information, segment identifiers and information, and driver preference information for each route segment.

If, back in block 506, it is determined that the segment is not known, then in block 528, new segment settings information may be stored in the memory module 108 by the CPU module 106. This information may include, for example, a "from" segment, a "to" segment, driver preference information, etc. as discussed above. After block 528, the process returns to block 516.

Those of ordinary skill would appreciate that the various illustrative logical blocks, modules, and algorithm steps described in connection with the examples disclosed herein may be implemented as electronic hardware, computer software, or combinations of both. Furthermore, the present invention can also be embodied on a machine readable medium causing a processor or computer to perform or execute certain functions.

To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed apparatus and methods.

The various illustrative logical blocks, units, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the examples disclosed herein may be embodied directly in hardware, in a software module executed by a processor, or in a combination of the two. The steps of the method or algorithm may also be performed in any order. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a wireless modem. In the alternative, the processor and the storage medium may reside as discrete components in the wireless modem.

The previous description of the disclosed examples is provided to enable any person of ordinary skill in the art to make or use the disclosed methods and apparatus. Various modifications to these examples will be readily apparent to those skilled in the art, and the principles defined herein may be applied to other examples without departing from the spirit or scope of the disclosed method and apparatus. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A system for controlling operation of a vehicle comprising:
   a component having at least two settings;
   a memory configured to store a route including a plurality of route segments, each route segment having a segment identifier and a setting for the component;
   a sensor configured to detect a current segment identifier; and
   a processor configured to:
      determine that the vehicle is approaching a start of an upcoming route segment that corresponds to a stored route segment in the memory based on the current segment identifier,
      determine whether a current setting of the component is different from the stored setting of the component that corresponds to the stored route segment, and control the component to be set to the stored setting in response to the vehicle approaching or reaching the start of the upcoming route segment and the current setting being different from the stored setting.

2. The system of claim 1 wherein the current segment identifier is at least one of a turn detection, an intersection detection, a change in road condition, a change in a speed of the vehicle or a predetermined distance traveled from a known location.

3. The system of claim 1 wherein the current segment identifier is a time of day and the processor controls the component to be set to the stored setting while the vehicle is in a parked position.

4. The system of claim 1 wherein the current setting is associated with at least one of an ECO/Sports mode, a temperature, a suspension firmness, a radio setting or a PHV charge timer.

5. The system of claim 1 wherein the processor is further configured to predict whether a current route is the route based on a current route segment.

6. The system of claim 1 wherein the memory is configured to store a plurality of next route segments that have been traveled after the upcoming route segment and the processor is further configured to predict one of the plurality of next route segments to be traveled when the upcoming route segment is complete.

7. The system of claim 1 wherein the processor is further configured to store the current setting of the component when a current route segment does not correspond to one of the plurality of route segments in the memory.

8. The system of claim 1 wherein the stored setting is the same for each of the plurality of stored route segments of the route.

9. The system of claim 1 wherein the processor is further configured to store a new setting when the component has been changed to the new setting after the processor controls the component to be set to the stored setting.

10. A system for controlling operation of a vehicle comprising:
a component having at least two settings;
a memory configured to store a route including a plurality of route segments, each route segment having a segment identifier and a setting for the component;
a route sensor configured to detect a current segment identifier;
an external sensor configured to detect a feature of an environment of the vehicle; and
a processor configured to:
determine a current route segment for a first trip of the current route segment using the current segment identifier,
determine a setting for the component based on the detected feature of the environment during the first trip of the current route segment,
store the determined setting in the memory for the current route segment, and
control the component to be set to the stored setting immediately prior to or during a second trip of the current route segment.

11. The system of claim 10 wherein the external sensor is a suspension sensor of the vehicle and the feature of the environment is a level of shock of the vehicle.

12. The system of claim 10 wherein the external sensor includes at least one of a thermometer, a moisture detector or a sunlight detector.

13. The system of claim 10 wherein the current segment identifier is at least one of a time of day, a turn detection, an intersection detection, a change in road condition, a change in a speed of the vehicle or a predetermined distance traveled from a known location.

14. The system of claim 10 wherein the memory is further configured to store a plurality of next route segments that have been traveled after the current route segment and the processor is further configured to predict one of the plurality of next route segments to be traveled when the current route segment is complete.

15. The system of claim 10 wherein the stored setting is the same for each of the plurality of stored route segments of the route.

16. The system of claim 10 wherein the processor is further configured to store a new setting when the component has been changed to the new setting after the processor controls the component to be set to the stored setting.

17. A system for applying driver preferences to a vehicle comprising:
a component having at least two settings;
a memory configured to store a route including a route identifier and a setting for the component;
a sensor configured to detect a current route identifier; and
a processor configured to:
predict a route using the current route identifier, and
control the component to be set to the stored setting corresponding to the predicted route prior to any portion of the route being driven.

18. The system of claim 17 wherein the current route identifier includes at least one of a current day of the week, whether the current day of the week is a weekday or a weekend, a current time of day or a date.

19. The system of claim 17 wherein the processor is further configured to control the component to be set to the stored setting by a particular time of day.

20. The system of claim 17 wherein the processor is further configured to control the component to be set to the stored setting prior to receiving an input to turn the car on.

21. The system of claim 20, wherein the input corresponds to at least one of a key being received by the vehicle, a FOB being received by the vehicle or a start button being selected.

22. A system for controlling operation of a vehicle comprising:
a component having at least two settings;
a memory configured to store a route including a plurality of route segments, each route segment having a segment identifier and a setting for the component;
a sensor configured to detect a time of day; and
a processor configured to:
determine a current route segment that corresponds to a stored route segment in the memory using the current segment identifier,
determine whether a current setting of the component is different from the stored setting of the component that corresponds to the stored route segment, and
control the component to be set to the stored setting when the current route segment of the vehicle is the stored route segment, the current setting is different from the stored setting and while the vehicle is in a parked position.

* * * * *